United States Patent Office 3,322,712
Patented May 30, 1967

3,322,712
BACTERIA RESISTANT LATICES OF GRAFT COPOLYMERS OF N-VINYL HETEROCYCLIC MONOMERS ON POLYMERIC BACKBONES
John B. Gardner and Billy G. Harper, Lake Jackson, Tex., assignors to The Dow Chemical Company, Midland, Mich., a corporation of Delaware
No Drawing. Filed Mar. 20, 1963, Ser. No. 266,477
5 Claims. (Cl. 260—29.6)

This invention relates to new compositions comprising aqueous dispersions of graft copolymers of N-vinyl heterocyclic monomers on polymers and copolymers in latex form previously prepared from ethylenically unsaturated monomers. In a preferred embodiment it pertains to the preparation of such grafted copolymers under the influence of high energy radiation and to the products obtained thereby.

Aqueous dispersions of polymers known as latexes have unquestioned great commercial use and value at the present time. A preponderance of such latexes require the addition of preservatives to prevent spoilage during storage and handling. Also, during formulation of latex coatings, ingredients which are bacteria nutrients, such as many of the thickeners, often are incorporated and thus increase the necessity for a preservative. A shortcoming of prior art coatings compositions is a propensity to attack by mildew, particularly when the coatings are used in regions having a hot and humid climate. The known preservatives have not been completely satisfactory since several critical qualities are required in a bactericide or fungicide for use with latexes. For example, the preservative must not contribute objectional color or odor to the aqueous dispersion or to the product dried therefrom. The effectiveness must persist for a period corresponding to reasonable storage times and desirably should be such as to resist contamination after considerable time in storage. Particularly, when large amounts are required to obtain the necessary persistence, the preservative must not cause destabilization or coagulation of the latex. The protection from attack, particularly from mildew, should also be effective in the dried coatings prepared from the latexes. The search for new preservatives for latexes has not been entirely successful. It has now been found that unexpected improvements in the action of bactericides and fungicides and desired properties of latex compositions are obtained by modification of the latex polymer itself.

The compositions of this invention complex with bactericides to give bacteria-resistant latexes which retain such resistance for a considerably greater time than ungrafted latexes which have been treated with the same bactericides. Similarly, complexes of compositions of this invention with fungicides when dried provide films which have improved mildew resistance.

It is an object of this invention to provide aqueous dispersions of new polymer compositions. A more particular object is to provide such dispersions which are bacteria- and mold-resistant. A further object is to provide such compositions in which the effectiveness of an added preservative is enhanced. Another object is to provide such compositions in which there can be used conventional preservatives and also those which, like bromine or iodine, would ordinarily be objectionable or unacceptable because of color, odor, etc. It is a further object to provide a polymer composition which has a cooperative interaction with a bactericide to prolong and enhance the bacteria-resistance without deleterious effect on the other properties of the composition. A still further object is to provide latexes which are resistant to subsequent contamination by bacteria. Yet another object is to provide a latex composition which when dried produces a film which is resistant to mildew. An additional object is to provide a latex which when used in pigmented compositions improves the mildew resistance of the dried product therefrom.

These and other objects are attained by the discovery of this invention whereby aqueous polymer compositions are readily prepared by forming an aqueous dispersion of a graft copolymer by polymerizing a minor amount by weight of an N-vinyl heterocyclic monomer selected from the group consisting of the N-vinyl lactams, the N-vinyl oxazolidinones, the N-vinyl oxazinidinones and the N-vinyl-3-morpholinones in admixture with a previously prepared synthetic latex comprising a polymer of an ethylenically unsaturated monomer selected from the group consisting of styrene and monomers copolymerizable with styrene.

The compositions are aqueous dispersions of graft copolymers of the N-vinyl heterocyclic monomers and the base polymer of a previously prepared latex and contain in grafted form from 0.5 percent to about 10 percent by weight of the N-vinyl heterocyclic monomer calculated on the weight of the polymer or copolymer in the base latex. The resulting aqueous dispersions of graft copolymer are amenable to the addition of bactericides, preservatives and the like and where such additaments are present the modified latexes have unusually effective and advantageous resistance to contamination by bacteria and provide films which are highly mildew resistant. The mildew resistance is retained when such latexes are used in the preparation of pigmented coatings. Some materials which are effective as bactericides and germicides, such as bromine and iodine, when added to prior art synthetic latexes cause objectional discoloration and odor in the absence of this invention. When bromine and iodine are added to the products of this invention no discoloration or odor is evident and the resulting products are highly resistant to contamination by bacteria and such resistance persists even when the latex is repeatedly contaminated by live bacteria.

The base latexes, i.e. the previously prepared latexes in which the N-vinyl heterocyclic monomers are polymerized, are synthetic latexes prepared from compounds containing the $CH_2=C<$ group. The term "base polymer" refers to the polymer comprising the base latex.

Suitable monomers containing the $CH_2=C<$ group include ethylenically unsaturated monomers such as styrene and monomers copolymerizable with styrene.

Specific example of such ethylenically unsaturated monomers are styrene, α-methylstyrene, ar-methylstyrene, ar-ethylstyrene, α-ar-dimethylstyrene, ar,ar-dimethylstyrene, vinylnaphthalene, hydroxystyrene, methoxystyrene, cyanostyrene, acetylstyrene, monochlorostyrene, dichlorostyrene and other halostyrenes, divinylbenzene, methyl methacrylate, ethyl acrylate, butyl acrylate, hexyl acrylate, 2-ethylhexylacrylate, luryl methacrylate, phenyl acrylate, acrylanilide, diethyl maleate, vinyl chloride, vinyl bromide, vinylidene chloride, vinylidene bromide, vinyl acetate, vinyl methyl ketone, methyl isopropenyl ketone, vinyl ethyl ether, 1,3-butadiene, isoprene, chloroprene, acrylic acid, fumaric acid, itaconic acid, maleic acid, maleic half esters, fumaric half esters, and others known to those skilled in the art. These specific examples are not intended to be an exhaustive list but are exemplary of monomers which may be homopolymerized or copolymerized by known emulsion polymerization procedures to obtain latexes which are useful as base latexes in the practice of this invention. Certain other monomers within the class of monomers which are copolymerizable with styrene, e.g. isobutylene and ethylene, usually are polymerized by procedures other than emulsion polymerization such as mass or solution methods and the resulting polymer is processed to form a latex. The latex polymer composition and the corresponding monomers required are selected according to the end use contemplated for the final product. The polymerization of the N-vinyl heterocyclic monomer therein is then carried out to obtain the advantages of this invention as described elsewhere in this specification. Because of the many uses for latexes which are film forming at room temperature often selections of monomers will be made to provide such film-forming base latexes. However, the temperature of film formation is not a critical feature of the base latex nor of a graft copolymer prepared therefrom.

In brief, one method of preparing a synthetic latex is by admixing the monomer or monomer mixture, such as 1,3-butadiene and styrene in the desired proportions, with an aqueous solution consisting of, for example, 99.62 percent by weight of water, 0.13 percent of Aquarex D (the sodium sulfate esters of a mixture of higher alcohols, principally lauryl and myristyl alcohols) as emulsifying agent, 0.09 percent of sodium bicarbonate and 0.16 percent of potassium persulfate as polymerization catalyst, in a closed pressure resistant vessel and heating the mixture at a temperature of about 50° to 95° C. with agitation. The latex starting material ordinarily has an alkaline pH value, but if acidic, may be adjusted to a neutral or to an alkaline pH value, e.g. to a pH of from 7 to 10, by addition of an alkali such as ammonia, ammonium hydroxide, or sodium or potassium hydroxide, if desired, prior to employing the latex for making the graft copolymer dispersions of the invention.

However, as noted above, the base synthetic latex may be prepared by methods other than emulsion polymerization. For instance, the polymer or copolymer may be prepared by mass, suspension or solution polymerization methods with subsequent formation of an aqueous colloidal dispersion by procedures known to those skilled in the art, e.g. a butyl rubber latex as described in U. S. Letters Patent 3,037,881.

The modified latexes, comprising aqueous colloidal dispersions of the graft copolymer containing from 20 to 60 percent by weight or more of graft copolymer, is readily prepared by subjecting the synthetic base latex starting material containing from 20 to 60 percent by weight of a polymer or copolymer to high energy ionizing radiation such as gamma rays, high speed electrons, X-rays or radiation from atomic piles or reactors, in a field having an intensity of at least 40,000 rads per hour and for a total dose of from about 0.5 to about 10 megarads to provide active sites along the polymer chains at which the grafting will occur. Thereafter, the irradiated latex is admixed with the N-vinyl heterocyclic monomer, e.g. N-vinyl-3-morpholinone, in the desired proportions and the graft copolymerization is allowed to proceed until the polymerization of the monomers is complete or substantially complete. The polymerization is readily carried out at room temperature or thereabout, but higher or lower temperatures can be used. The polymerization is usually complete in from 5 to 10 hours or less at room temperature. The process can be carried out batchwise or in continuous manner. For example, the base latex is flowed continuously as a stream through a zone subjected to gamma radiation from a cobalt-60 source thereby obtaining the desired dosage of radiation to produce active sites along the polymer chains, then the irradiated latex is mixed with the N-vinyl heterocyclic monomer in the predetermined proportions, and passed through a zone wherein polymerization takes place to produce the graft copolymer composition. Alternatively, the N-vinyl heterocyclic monomer is mixed with the latex and the mixture thereafter subjected to high energy ionizing radiation to effect the graft copolymerization.

While the high energy irradiation procedure described supra is a preferred embodiment, other means can be used. For instance, the base latex is admixed with the N-vinyl heterocyclic monomer in the desired proportions together with a free-radical generating catalyst. The mixture is then heated to a temperature such as from about 50° C. to about 95° C. to graft copolymerize the N-vinyl heterocyclic monomer. The free radical producing catalysts include the usual peroxygen polymerization catalysts such as sodium persulfate, potassium persulfate, ammonium persulfate, benzoyl peroxide, lauroyl peroxide, acetyl peroxide, and the like. The free radical producing catalysts are preferably selected from those such as benzoyl peroxide which have been shown to promote graft polymerization with other monomers and hydrocarbon polymers.

Additives such as stabilizers, antioxidants, plasticizers, thickening agents, pigments, dyes, etc., can be incorporated with the aqueous colloidal dispersions of the graft copolymer compositions if desired.

The N-vinyl heterocyclic monomers applicable to the practice of this invention include the N-vinyl cyclic amides and N-vinyl cyclic carbamates of the respective formulae:

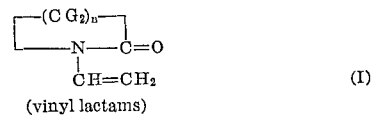

(vinyl lactams)   (I)

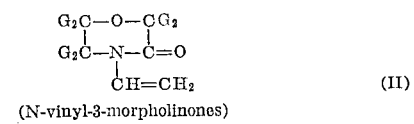

(N-vinyl-3-morpholinones)   (II)

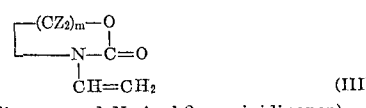

(N-vinyl-2-oxazolidinones and N-vinyl-2-oxazinidinones)   (III)

wherein each G is independently selected from the class consisting of hydrogen and alkyl radicals of from 1 to 4 carbon atoms; each Z is independently selected from the class consisting of hydrogen, alkyl radicals of from 1 to 4 carbon atoms and aryl radicals containing from 6 to 10 carbon atoms; $n$ is an integer from 3 to 5; and $m$ is an integer from 2 to 3. Specific examples of such monomers are N-vinyl-2-pyrrolidone, N-vinyl caprolactam, N-vinyl piperidone, N-vinyl-5-methyl-2-pyrrolidone, N-vinyl-3,3-dimethyl-2-pyrrolidone, N-vinyl-3,3-dimethyl piperidone, N-vinyl-2-oxazolidinone, N-vinyl-5-methyl-2-oxazolidinone, N-vinyl-5-ethyl-2-oxazolidinone, N-vinyl-4,5-dimethyl oxazolidinone, N-vinyl-2-oxazinidinone, N-vinyl-6-methyl-2-oxazinidinone, N-vinyl-3-morpholinone and N-vinyl-5-methyl-3-morpholinone. Mixtures of two or more of the heterocyclic monomers may be used, if desired.

The N-vinyl heterocyclic monomers useful in the practice of this invention may be prepared, for example, by the method described in United States Letters Patent No. 2,891,058.

Especially advantageous compositions are obtained when bromine or iodine are mixed with the grafter copolymers hereinbefore described. The amount of such additives which is operable ranges from about 0.01 percent to about 5 percent by weight but preferably is from about 0.1 percent to about 1 percent by weight, based on the weight of the graft copolymer in the latex. However, other bactericides and fungicides may be substituted for the bromine or iodine if desired, e.g. hexachlorophene, tribromosalicylanilide, tetrachlorosalicylanilide, diphenyl oxide sulfonate, ethylmercurithiosalicylate, and the like. The preservatives, e.g. iodine, usually are dissolved in a water-miscible solvent, such as methanol, then are blended with the latex by stirring to form the compositions which are resistant to microorganisms.

The following examples illustrate ways in which the principle of the invention has been applied but are not to be construed as limiting its scope.

Example 1

A synthetic latex containing approximately 45 percent by weight of a copolymer of 60 percent by weight of styrene and 40 percent of 1,3-butadiene—prepared by polymerizing in a closed system a mixture of the monomers in an aqueous emulsion, i.e. in admixture with an aqueous solution consisting of approximately 99.62 percent of water, 0.16 percent of potassium persulfate, 0.13 percent of Aquarex D (the sodium salts of sulfate monoesters of a mixture of higher fatty alcohols, chiefly lauryl and myristyl derivatives of the type $RSO_4Na$), and 0.09 percent of sodium carbonate at a temperature of 80–90° C.—was subjected to gamma rays from a 3450-curie cobalt-60 source for a total dose of 0.5 megarad. To 100 grams of the irradiated latex was added 5 grams of a 50 percent aqueous solution of N-vinyl-3-morpholinone. The mixture was stirred thoroughly and then was allowed to stand overnight at room temperature to ensure ample time for grafting to take place. The product was a graft copolymer latex hereinafter referred to as Latex 1A. A comparison of the good mechanical and freeze-thaw stability of the base latex with those properties of Latex 1A showed no significant change. To the Latex 1A was added 10 grams of a methanolic solution containing 10 percent of iodine. As the mixture was stirred, it first became discolored but with further stirring returned to the normal white color. A portion of Latex 1A having the iodine mixed therein was inoculated with bacteria (pseudomonas sp.) contained in latex media.

After 48 hours, a sample was withdrawn with a sterile needle and tested for living bacteria. Such testing showed that all the bacteria had been killed. In like manner the sample was then reinoculated and checked until a total of 15 inoculations had been made; all the bacteria thus introduced were killed, and the test was discontinued.

For comparison with the above advantageous product of this invention, another portion of the same styrene-butadiene latex was treated in the same manner with N-vinyl-3-morpholinone except that the irradiation step was omitted. (This composition is hereinafter referred to as Latex 1B). Latex 1B was treated with the same proportion of the iodine solution as Latex 1A in the description above. The addition of the iodine solution caused Latex 1B to turn dark brown and to remain that color. When Latex 1B with the iodine mixed therein was inoculated with bacteria infected latex in the same manner as described above, the bacteria, were killed only through the third inoculation and not thereafter. (Latex 1B is not an example of this invention.)

In other tests it has been demonstrated that N-vinyl-3-morpholinone monomer does not complex with iodine. However, a polymer of N-vinyl-3-morpholinone does form a complex with iodine and such a complex is colorless. Further, it is known that under the conditions of the radiation treatment described supra, homopolymerization of N-vinyl-3-morpholinone does not take place. It is believed that the N-vinyl heterocyclic monomer is grafted on the styrenebutadiene copolymer (whereupon active polymerization sites had been generated). Regardless of the mechanism, the process contemplated in this invention results in a product, e.g. Latex 1A, which is not discolored by the addition of iodine whereas in a latex in all respects the same except that it had not been subjected to ionizing radiation conducive to graft polymerization, e.g. Latex 1B, there occurred and persisted completely unacceptable discoloration when the same proportion of iodine was added. Furthermore, the bactericidal activity of the product of this invention, e.g. Latex 1A to which iodine had been added, still persisted after 15 inoculations whereas a latex (latex 1B) with the absence of one of the features of this invention but having the same amount of iodine admixed therewith was bacteria-resistant for only three inoculations and failed thereafter.

Example 2

A pigment dispersion was prepared according to the following recipe:

| | Parts (by weight) |
|---|---|
| Water | 150 |
| Potassium tripolyphosphate | 2 |
| Phenyl mercuric acetate | 5 |
| Titanium dioxide | 180 |
| Mica | 50 |
| Silica (Celite 281) | 40 |
| Clay | 40 |
| Sodium o-phenylphenolate, tetrahydrate | 20 |
| Polypropylene glycol (mol. wt. 1200) | 4 |

To 125 grams of the pigment dispersion was added 100 grams of Latex 1A having iodine mixed in the same proportions and as described in Example 1. The resulting pigmented latex was then painted on untreated pine board.

Other panels were prepared in the same manner and using the same materials in the same proportions except that instead of Latex 1A, the same quantities of the following latexes were individually substituted:

(a) Latex 1B and (b) A latex of a copolymer of styrene and butadiene (the same latex as used for the base copolymer in preparing the grafted Latex 1A) which subsequently was subjected to the irradiation procedure but having no N-vinyl heterocyclic monomer added thereto.

These so-prepared panels were tested concurrently by exposing them to the atmosphere (Texas gulf coast) for 240 days, then examining them for mildew resistance. The panel coated with the composition containing Latex 1A (a latex of this invention) showed excellent mildew resistance, i.e. no evidence of mildew. Conversely, the panels from the other two latexes (not latexes of this invention) showed substantial mildew growth and discoloration.

Example 3

Individual portions of Latex 1A and Latex 1B were mixed with a methanolic solution of iodine as described in Example 1. With a 50-gram portion of the same base latex of a copolymer of styrene and butadiene which was used in preparing Latexes 1A or 1B was blended 1.5 grams of poly(N-vinyl-3-morpholinone), then 5 ml. of a 5 percent methanolic solution of iodine was added to the resulting blend. Untreated pine boards were coated individually with one of the three latex compositions. The panels so produced were exposed to the Texas gulf coast atmosphere. Evidence of mildew attack was present within 3 to 4 weeks on the panels coated with the compositions containing Latex 1B or the blend of the base latex with poly(N-vinyl-3-morpholinone). These two materials are not products of this invention. However, the panel coated with a composition of this invention, containing Latex 1A, showed excellent resistance to mildew, i.e. no evidence of mildew attack, when the test was terminated after 150 days.

Example 4

A 50-gram portion of the same base latex of a copolymer of styrene and butadiene as used in Example 1 was irradiated with high energy electrons from a one-million-volt General Electric resonant transformer operated at a beam current of 1 milliampere to a total dose of 4.0 megarads. With the irradiated latex produced thereby was mixed thoroughly 1.25 grams of N-vinyl-5-methyl-2-oxazolidinone at room temperature. After being allowed to stand overnight a 25-gram portion of this graft modified latex was blended with 5 ml. of a 5 percent methanolic solution of iodine. The resulting modified latex composition was white. A dried clear coating of the composition on a pine panel remained clear during exposure for four months to the atmosphere on the Texas gulf coast.

*Example 5*

In the same manner as in Example 4 and using the same proportions a modified latex product was prepared except that the same quantity of N-vinyl-2-pyrrolidone was substituted for the N-vinyl-5-methyl-2-oxazolidinone. Upon addition of the same proportion of iodine solution the same excellent mildew resistance was obtained as that shown in Example 4. In the same way, other N-vinyl heterocyclic monomers can be grafted to latexes to obtain similar advantageous results.

Likewise, other bactericides and mildewcides can be complexed with the graft copolymer latexes of this invention to provide compositions which are bacteria and mildew resistant and when such compositions are dried, they retain their excellent mildew resistance for extended periods of time.

In the foregoing examples and the comparisons provided therewith, among the advantages which can be seen is that modification of base latexes by the process of this invention enhances the action of bactericides and mildewcides by causing their preservative action to persist for much longer periods of time either in the modified latex as such or in the dried product obtained therefrom compared to the starting base latex. A blend of the base latex and a preformed homopolymer of the N-vinyl heterocyclic monomer does not produce the same results as the polymerization of the N-vinyl heterocyclic monomer while admixed with the previously prepared base latex.

What is claimed is:

1. A composition comprising a non-discolored aqueous dispersion of a bactericide selected from the group consisting of iodine and bromine and a graft copolymer of a minor amount by weight of an N-vinyl heterocyclic monomer and a major amount by weight of a polymer of an ethylenically unsaturated monomer; said heterocyclic monomer being selected from the group consisting of the N-vinyl cyclic amides, the N-vinyl cyclic carbamates, and mixtures thereof having the formulae:

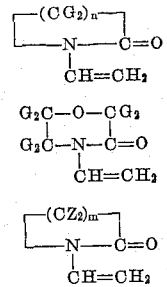

wherein each G is independently selected from the class consisting of hydrogen and alkyl radicals of from 1 to 4 carbon atoms; each Z is independently selected from the class consisting of hydrogen, alkyl radicals of from 1 to 4 carbon atoms and aryl radicals containing from 6 to 10 carbon atoms; $n$ is an integer from 3 to 5; and $m$ is an integer from 2 to 3; said bactericide and said graft copolymer being combined as an odorless complex.

2. The composition of claim 1 in which the bactericide is iodine.

3. The composition of claim 1 in which the bactericide is bromine.

4. The process of preparing a bacteria-resistant, mildew-resistant aqueous dispersion of a polymer comprising the steps of (A) making an aqueous dispersion of a graft copolymer by polymerizing a minor amount by weight of an N-vinyl heterocyclic monomer selected from the group consisting of the N-vinyl cyclic amides, N-vinyl cyclic carbamates and mixtures thereof having the formulae:

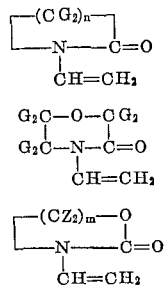

wherein each G is independently selected from the class consisting of hydrogen and alkyl radicals of from 1 to 4 carbon atoms; each Z is independently selected from the class consisting of hydrogen, alkyl radicals of from 1 to 4 carbon atoms, and aryl radicals containing from 6 to 10 carbon atoms; $n$ is an integer from 3 to 5; and $m$ is an integer from 2 to 3; said heterocyclic monomer being mixed prior to polymerization with a major amount by weight of a previously prepared synthetic latex comprising a polymer of an ethylenically unsaturated monomer and (B) mixing with the resulting aqueous dispersion a bactericide selected from the group consisting of iodine and bromine; whereby there is obtained a non-discolored latex containing an odorless complex of said graft copolymer and said bactericide.

5. The process of claim 4 in which the polymerization of the N-vinyl heterocyclic monomer is effected by irradiation with high energy radiation at an intensity of at least 40,000 rads per hour to a dose of from about 0.5 to about 10 megarads.

References Cited

UNITED STATES PATENTS

| | | | |
|---|---|---|---|
| 497,082 | 5/1893 | Weidig et al. | 167—17 |
| 2,286,636 | 6/1942 | Murray | 167—42 |
| 2,965,553 | 12/1960 | Dixon et al. | 204—154 |
| 2,977,278 | 3/1961 | Shelanski et al. | 167—17 |
| 2,979,447 | 4/1961 | Levine | 204—154 |

SAMUEL H. BLECH, *Primary Examiner.*

MURRAY TILLMAN, *Examiner.*

J. ZIEGLER, J. GOOLKASIAN, *Assistant Examiners.*